US006826447B2

(12) United States Patent
Divine et al.

(10) Patent No.: US 6,826,447 B2
(45) Date of Patent: Nov. 30, 2004

(54) PROCESS FOR THE CREATION AND ENRICHMENT OF A DATA BASE OF A POST SORTING SYSTEM

(75) Inventors: Marc Divine, Sceaux (FR); Laurent Henault, Verrieres-le-Buisson (FR)

(73) Assignee: Neopost Industrie, Bagneux (FR)

( * ) Notice: Subject to any disclaimer, the term of this patent is extended or adjusted under 35 U.S.C. 154(b) by 2 days.

(21) Appl. No.: 10/462,611

(22) Filed: Jun. 17, 2003

(65) Prior Publication Data

US 2004/0034446 A1 Feb. 19, 2004

(30) Foreign Application Priority Data

Jun. 17, 2002 (FR) ............................................ 02 07419

(51) Int. Cl.[7] ........................... G06F 7/00; G06F 17/00; B07C 5/00; G06K 9/00

(52) U.S. Cl. ....................... 700/224; 700/225; 700/223; 209/584; 209/629; 209/630; 707/100; 707/102

(58) Field of Search ................................ 700/223, 224, 700/225, 226; 209/584, 629, 630; 707/100, 101, 102

(56) References Cited

U.S. PATENT DOCUMENTS 6,276,535 B1 * 8/2001 Winkelman et al. ........ 209/547
6,557,000 B1 * 4/2003 Seestrom et al. ........... 707/100
6,570,115 B1 * 5/2003 Rosenbaum ................ 209/584
6,647,385 B2 * 11/2003 Seestrom et al. ........... 707/100
6,704,401 B2 * 3/2004 Piepho et al. .......... 379/102.03
6,741,724 B1 * 5/2004 Bruce et al. ................ 382/101

FOREIGN PATENT DOCUMENTS

EP 1 154 363 A2 11/2001

* cited by examiner

*Primary Examiner*—Gene O. Crawford
(74) *Attorney, Agent, or Firm*—Sughrue Mion, PLLC

(57) ABSTRACT

This invention relates to a process for automatically creating and enriching a data base in a system for sorting mail items linked, through an INTRANET communications network, to computer stations of addressees of these mail items and comprising reading means for recognizing postal data printed on these mail items, processing means in order, in relation with a work data base comprising identification data relative to the addressees of the mail items, to identify the individual addressee of a determined mail item, and sorting means for allocating this mail item to the addressee thus identified, process in which there is firstly automatically sent to the electronic mail address of each addressee, a determined electronic message requesting him to be connected on a WEB page of the sorting system in order to enter personal identification data, and, once entered, these data are then automatically stored in a temporary data base for comparison with the data present in the work data base in order thus to ensure automatic update thereof.

10 Claims, 2 Drawing Sheets

PROCESS FOR THE CREATION AND ENRICHMENT OF A DATA BASE OF A POST SORTING SYSTEM

FIELD OF THE INVENTION

The present invention relates exclusively to the domain of mail handling and more particularly to a process for automatically creating and enriching a data base of a system for sorting mail items.

BACKGROUND OF THE INVENTION

The sorting of mail in commercial or industrial enterprises or in public administrations is most often an essentially manual procedure. The employee in the mail department in charge of this task takes the mail items one by one, notes the mention of the person or department addressed to and, possibly after having opened this mail item, deposits it in the box corresponding to this person or department. It is clear that such an entirely manual procedure is long and its productivity is very low.

It has thus been sought to increase this productivity by proposing different types of devices allowing a certain automatization of the manual sorting procedure. For example U.S. Pat. No. 4,921,107 and French Patent Application FR 2 795 980 in the name of Applicants concern such devices.

However, one and the other of the solutions developed in these two documents employ a data base comprising a correspondence table which associates a unique box identification number with the different addressees of the mail items (physical persons, departments or other).

Now, for the sorting of these mail items to be efficient, taking into account the frequent reorganizations of departments or of persons existing in an enterprise, the data base must be updated and enriched regularly.

It is therefore an object of the present invention to overcome this drawback by proposing a particularly simple process for updating the data base of a post sorting system. The invention also has for its object to ensure such updating automatically and possibly regularly.

SUMMARY OF THE INVENTION

These objects are attained by a process for automatically creating and enriching a data base in a system for sorting mail items linked, through an INTRANET communications network, to computer stations of addressees of these mail items and comprising reading means for recognizing postal data printed on these mail items, processing means in order, in relation with a work data base comprising identification data relative to the addressees of the mail items, to identify the individual addressee of a determined mail item, and sorting means for allocating this mail item to the addressee thus identified, characterized in that there is firstly automatically sent to the electronic mail address of each addressee, a determined electronic message requesting him to be connected on a WEB page of the sorting system in order to enter personal identification data, and, once entered, these data are then automatically stored in a temporary data base for comparison with the data present in the work data base in order thus to ensure automatic update thereof.

Thanks to this particular process employing two data bases, it is possible to update, regularly and automatically, the list of potential addressees of the mail items without specifically interrupting the sorting procedure.

In a preferred form of embodiment, the electronic connection message is relayed to each addressee user of said INTRANET communications network by a network administration computer station.

The electronic connection message advantageously comprises a URL address of said WEB page of the sorting system, so as to allow in one single validation an automatic visualization of a mask for entry of said personal identification data. The personal identification data entered are preferably chosen from the group comprising the name, the Christian name, the electronic address, the telephone, the department or the function of the addressee.

According to a privileged form of embodiment, the electronic connection message is addressed at a predetermined periodicity, for example each month.

The invention also relates to a post sorting system linked, through an INTRANET communications network, to computer stations of addressees of these mail items and carrying out the afore-mentioned process, this mail sorting system comprising reading means for recognizing postal data printed on these mail items, processing means in order, in relation with a work data base comprising identification data relative to the addressees of the mail items, to identify the individual addressee of a determined mail item, and sorting means for allocating this mail item to the addressee thus identified, characterized in that it further comprises a second data base for temporarily storing personal identification data previously entered at the level of a WEB page of the sorting system displayed on the computer stations of the addressees of the mail items in response to the automatic dispatch by the sorting system of a determined electronic connection message to these addressees.

The processing means further comprise means for comparing the personal identification data entered and stored in the temporary data base with corresponding identification data stored in the work data base, and means are provided to modify the contents of the work data base as a function of the results furnished by the comparison means.

The sorting system of the invention advantageously further comprises a network administration computer station for relaying said electronic connection message to each addressee user of said INTRANET communications network.

BRIEF DESCRIPTION OF THE DRAWINGS

The invention will be more readily understood on reading the following description, given by way of non-limiting indication, with reference to the accompanying drawings, in which.

DESCRIPTION OF PREFERRED EMBODIMENT

Figure 1:
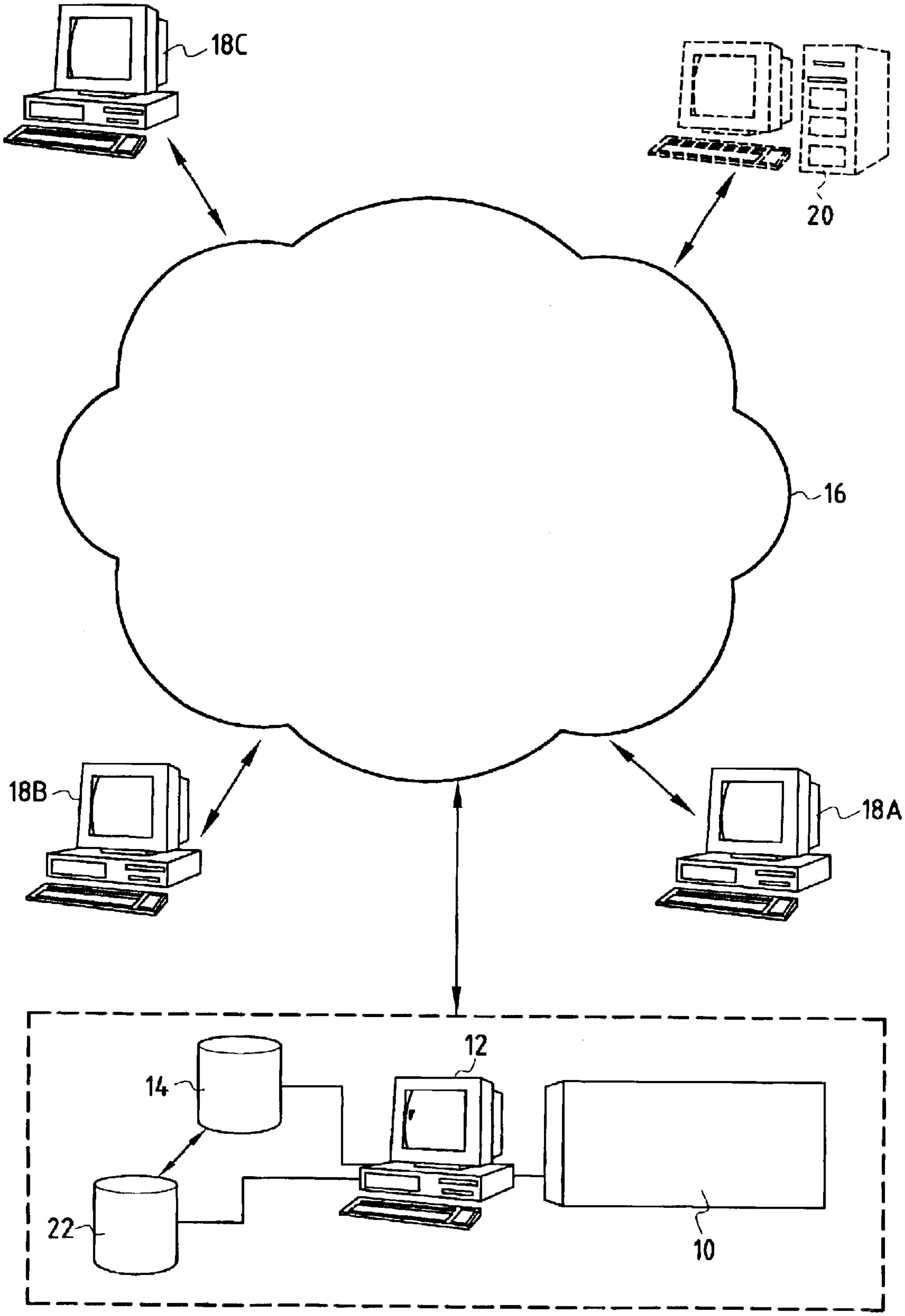
FIG. 1 illustrates an example of a post sorting system according to the invention.

The present invention is carried out within the framework of existing post sorting systems, whether they be entirely automatized, at average or high rate, for example those present within the Postal Service, or simply semi-automatic like the majority of present-day mail item sorting devices of commercial or industrial enterprises.

Referring now to the Figures, a post sorting system is conventionally composed of a sorting machine 10 provided, on the one hand, with means for reading and determining the addressee of the mail items, for example an optical reader associated with character recognition software, in order to recognize the postal data printed on the mail items, and, on the other hand, with means for identifying and sorting the mail items thus recognized in order to identify the particular addressee of a given mail item and to allocate said item to that addressee. This machine is managed from a processing unit 12 (conventionally comprising microprocessor calculating means, programme and data memory means and interface means) associated with a data base 14 comprising identification data relative to the potential addressees of the mail items, these two elements being able, or not, to be integrated directly in the sorting machine.

Character recognition is essentially directed towards the name or the function of the addressee of the mail item, the service or department of the enterprise to which this mail item is addressed. However, it may also advantageously integrate the name of the sender (which may for example appear in the slogan of the postal indicia). These different postal data identified on a given mail item make it possible to allocate to this mail item a single box number by comparison with corresponding identification data contained in the data base.

This data base also comprises non-postal data allowing information on the addressee, as is described in Applicants' French Patent Application mentioned in the preamble and, more particularly, his electronic mail address (e-mail address) within an INTRANET communications network 16 which links together the different computer stations (personal computers or the like, for example 18A, 18B and 18C) of the potential addressees of the sorted mail items and to which the post sorting system is also connected. Depending on the configuration and size of the network, it may also be provided to connect to this private network a specific network administration computer station 20.

Figure 2:
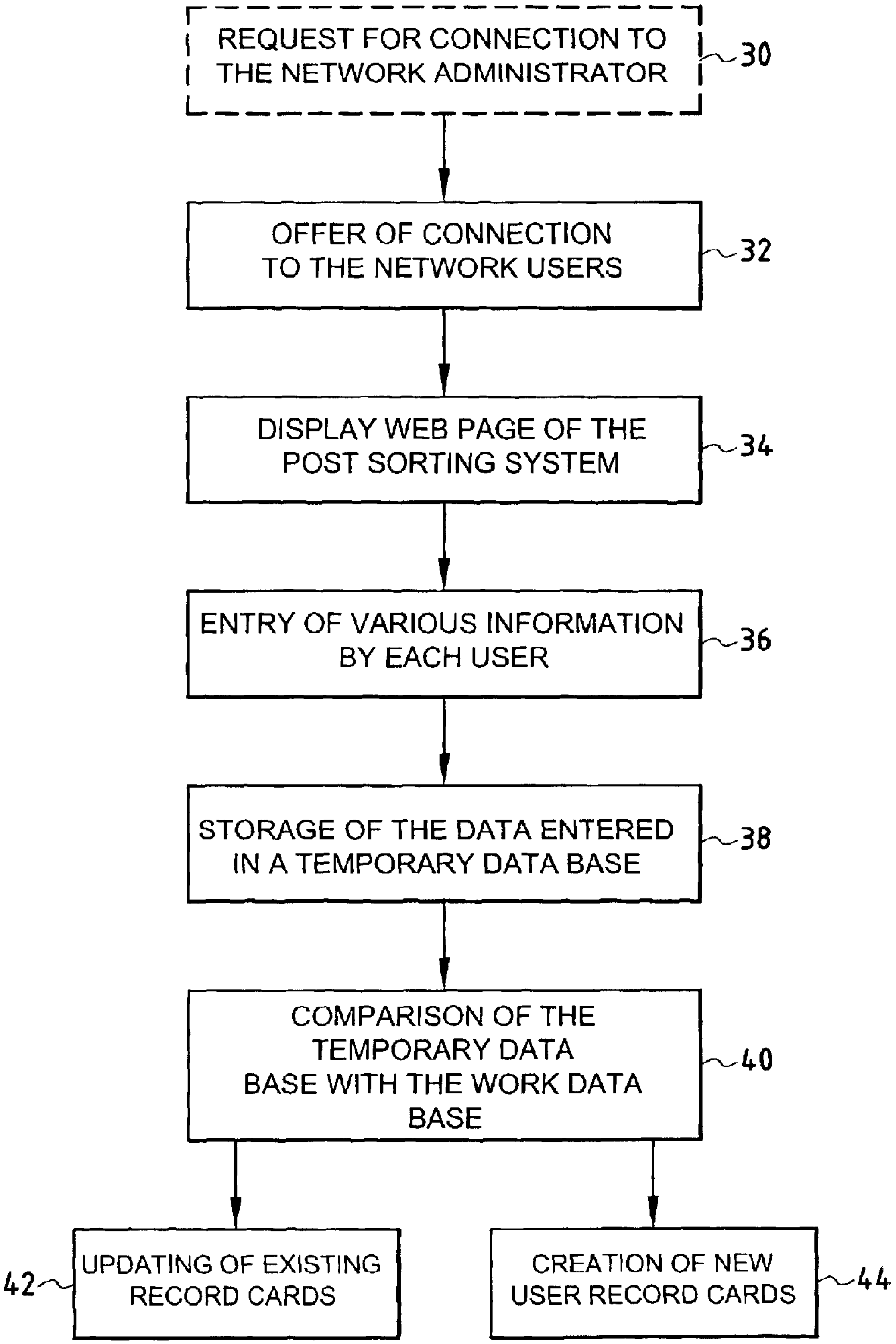
FIG. 2 is a flowchart explaining the process of creating and enriching the data base employed in the post sorting system of FIG. 1.

According to the invention, there is added to the first data base 14, which is the work data base of the post sorting system, a second data base 22 intended to allow an automatic updating of the work data base. The second data base is a temporary base directly enriched by the addressees which have access thereto through the private communications network 16 and whose contents are then intended to be compared to those of the work data base (inaccessible for the addressees) for an updating of the latter in accordance with the procedure described with reference to FIG. 2.

It will firstly be noted that the initial procedure of creation and the subsequent procedure of enrichment of the data base are based on the same principle and both therefore follow the same operating steps which will now be described.

The first step 30 is initiated by the sorting system, more precisely by its processing unit 12. However, it will be different depending on whether or not the INTRANET network comprises an administration station 20.

When this network comprises an administration station, this first step consists, in that case, for the processing unit 12, in addressing to that administration station 20, by an electronic mail, a request for connection of the users of the network with the post sorting system. In other words, the processing unit sends to the administration station (which thus acts as communications relay) an electronic message in which it requests the latter to address in turn to all the users of the network (all the addressees of mail having access to the communications network), an electronic message requesting them to connect to a WEB page of the post sorting system. This offer of connection may be facilitated by directly mentioning the URL address of the page in question in this electronic connection message, so as to allow this page to be visualized in one single validation (one single click of a pointing peripheral such as a mouse).

When the network does not have an administrator (therefore no network administration computer station 20), this offer of connection proposed to the users of the network (step 32) may constitute the first step of the process of the invention. In effect, in this configuration, it is in that case the processing unit which will directly send to all the users of the network the afore-mentioned electronic message. This dispatch may be made to predetermined electronic mail addresses (particularly in the case of enriching the base) or to a general electronic mail address recognized by all the users of the network (preferable when the base is created). It is preferably effected at a predetermined periodicity, for example at the beginning of each month. However, a shorter period (each week) or longer period (each quarter) is, of course, possible.

The following step 34 is effected by all the users who, after reading their electronic mail and validation, will each display the WEB page housed on the post sorting system on their own computer station (18A to 18C), this page consisting in a mask for entry of personal identification data. Each user, potential addressee of mail, may in that case, in a new step 36, create or modify his personal identification data which appear before him on the screen of his computer station in the form of a personal information record card. The latter mentions the different information, postal or other, necessary for processing the mail items which are intended for him (name, Christian name, electronic address, telephone, telecopy, department, function, etc. . . . ). Once this entry has been made, the entered identification data are automatically stored in the temporary data base 22 (step 38).

The following step 40 then consists in the comparison of the data entered by the users and stored in the temporary data base with the corresponding data already present in the work data base 14. This comparison is effected at the request of the processing unit 12 of the post sorting system at a predetermined instant, which is a function for example of the number of responses received or of a fixed length of time determined with respect to the initial request for connection. Depending on the result of this comparison effected for each addressee (itself a function of the data entered), either the existing registrations (corresponding to the record cards of addressees) will be automatically updated (step 42) or one or more new registrations will be created in the work data base (step 44).

The invention is, of course, not limited to the form of embodiment described hereinabove and the person skilled in the art will be able to imagine variants without inventive activity. For example, the modification of the addressee record cards can be envisaged not to be effected at a predefined periodicity at the request of the sorting system, but, on the contrary, at any moment, for example after each modification made by an addressee. Similarly, the comparison of the data bases may also be envisaged to be effected periodically, irrespective of whether modifications were made previously.

What is claimed is:

1. Process for automatically creating and enriching a data base in a system for sorting mail items linked, through an INTRANET communications network, to computer stations of addressees of these mail items and comprising reading means for recognizing postal data printed on these mail items, processing means in order, in relation with a work data base comprising identification data relative to the addressees of the mail items, to identify the individual addressee of a determined mail item, and sorting means for allocating this mail item to the addressee thus identified, wherein it comprises the following steps of:

firstly automatically sending to the electronic mail address of each addressee, a determined electronic message requesting him to be connected on a WEB page of the sorting system in order to enter personal identification data, and, once these data are entered, then automatically storing them in a temporary data base for comparison with the data present in the work data base in order thus to ensure automatic update thereof.

2. The process of claim 1, wherein said electronic connection message is relayed to each addressee user of said INTRANET communications network via a network administration computer station.

3. The Process of claim 1, wherein said electronic connection message comprises a URL address of said WEB page of the sorting system, so as to allow in one single validation an automatic visualization of a mask for entry of said personal identification data.

4. The process of claim 1, wherein said personal identification data entered are chosen form the group comprising the name, the Christian name, the electronic address, the telephone, the department or the function of the addressee.

5. The process of claim 1, wherein said electronic connection message is addressed at a predetermined periodicity, for example each month.

6. Post sorting system linked, through an INTRANET communications network, to computer stations of addressees of mail items and carrying out a process for automatically creating and enriching a database, this mail sorting system comprising reading means for recognizing postal data printed on these mail items, processing means in order, in relation with a work data base comprising identification data relative to the addressees of the mail items, to identify the individual addressee of a determined mail item, and sorting means for allocating this mail item to the addressee thus identified, wherein it further comprises a second data base for temporarily storing personal identification data previously entered at the level of a WEB page of the sorting system displayed on the computer stations of the addressees of the mail items in response to the automatic dispatch by tile sorting system of a determined electronic connection message to these addressees.

7. The sorting system of claim 6, wherein it further comprises a network administration computer station for relaying said electronic connection message to each addressee user of said INTRANET communications network.

8. The sorting system of claim 6, wherein said electronic connection message comprises a URL address of said WEB page of the sorting system, so as to allow in one single validation an automatic visualization or a mask for entry of said personal identification data.

9. The sorting system of claim 6, wherein said processing means further comprise means for comparing the personal identification data entered and stored in the temporary data base with corresponding identification data stored in the work data base.

10. The sorting system of claim 9, wherein it further comprises means for modifying the contents of the work data base as a function of the results furnished by the comparison means.

* * * * *